Dec. 20, 1955   B. T. HENSGEN   2,727,616
CAN TURNING MECHANISM FOR CANNED SAUSAGE
Filed March 16, 1953   3 Sheets-Sheet 1

BERNARD T. HENSGEN
INVENTOR.

BY R. L. Story
ATTORNEY

BERNARD T. HENSGEN
INVENTOR.

BY R. L. Story
ATTORNEY

Dec. 20, 1955  B. T. HENSGEN  2,727,616
CAN TURNING MECHANISM FOR CANNED SAUSAGE
Filed March 16, 1953  3 Sheets-Sheet 3

BERNARD T. HENSGEN
INVENTOR.

BY R. D. Story
ATTORNEY

United States Patent Office 2,727,616
Patented Dec. 20, 1955

2,727,616
CAN TURNING MECHANISM FOR CANNED SAUSAGE

Bernard T. Hensgen, Chicago, Ill., assignor to Swift & Company, Chicago, Ill., a corporation of Illinois Application March 16, 1953, Serial No. 342,664

7 Claims. (Cl. 198—33)

The instant invention relates to an apparatus for carrying long pieces of material, as for example sausages, past a plurality of knives to cut the material into shorter lengths and to arrange the material at a specific point in a predetermined alignment.

The apparatus is particularly applicable for use in the process of preparing canned Vienna sausages where long "sticks" of the Vienna sausages are sliced into lengths appropriate to the size of the can, and then inserted into the can. While upon occasion this has been a hand operation, there have been proposals in the past to perform the job by machinery. Such a proposal is found in U. S. Patent No. 2,048,156.

The objects and advantages of the present invention include the following:

A device that is compact and does not occupy a large amount of floor space;

A device that is simply constructed to accommodate any desired lengths of sausages requiring substantially only the addition of an extra row of sausage holders and cutting knives, with the driving and other moving parts remaining essentially unchanged;

A device that is low in first cost, having parts easily produced by simple metal working operations;

A device that is speedy and positive in operation;

A device that positions the sausages vertically for insertion into the cans;

A device that provides a clean cutting action and does not tend to tear the sausages and gum up the parts of the machine; and A device that is easily cleaned and kept in a sanitary condition.

Other objects and advantages will become apparent from the following description taken in conjunction with the drawings in which.

Figure 1:
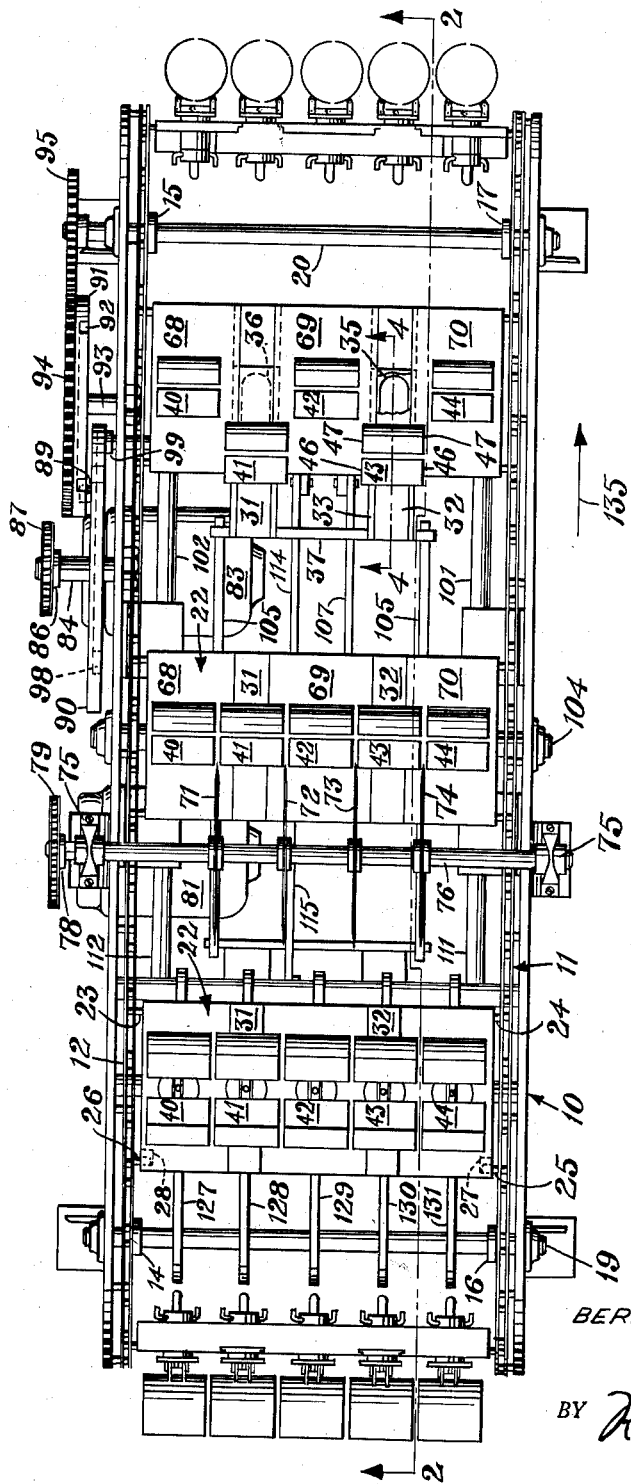
Figure 1 is a plan view of the embodiment of the invention with the knife cover removed.

In the illustrated embodiment the mechanism is mounted on a frame, generally 10. An endless conveyor, generally 11, is formed from a pair of chains, 12 and 13. Chain 12 rotates about two sprockets 14 and 15. Similarly, chain 13 is mounted on two sprockets 16 and 17. A shaft 19 suitably journaled in frame 10 is attached to and carries both of sprockets 14 and 16, while a similar shaft 20 is attached to and carries sprockets 15 and 17.

Regularly spaced between chains 12 and 13 are a plurality of holder supports, generally 22. Each holder support 22 is attached to the two chains with a pair of forward pins 23 and 24, connecting the support to chains 13 and 12, respectively. A pair of rearward pins 25 and 26 also attach the support to the chains. As is shown in Figure 1, the rearward pins 25 and 26 are received in slots 27 and 28, respectively, in the holder 22 to permit a relative movement of the chain with respect to the support to occur to accommodate the movement of the chain around the sprockets.

Figures 3, 4:
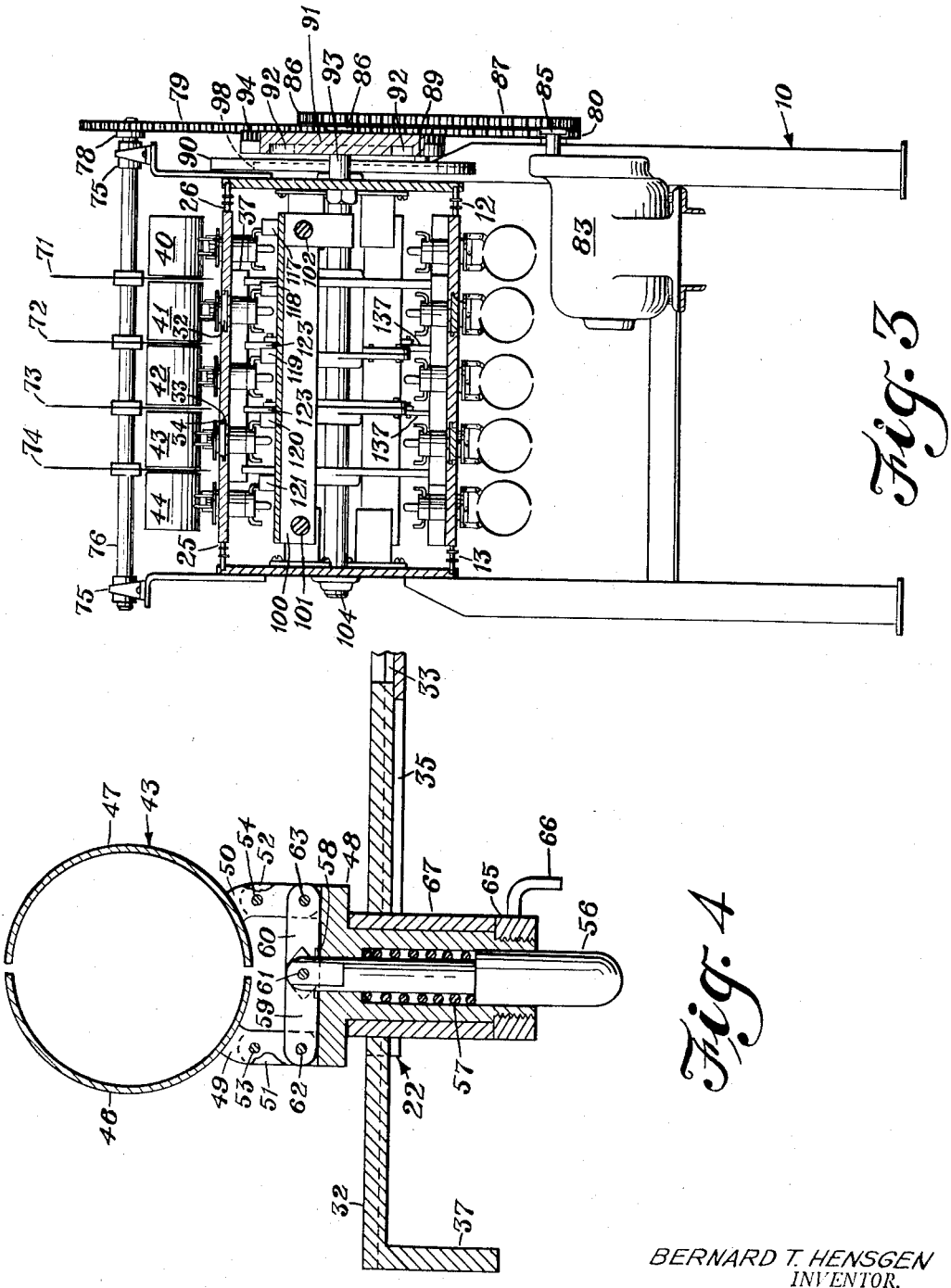
Figure 3 is a partial section taken at line 3—3 of Figure 2, with the knife covering removed.
Figure 4 is a partial section taken at line 4—4 of Figure 1.

Spaced within holder supports 22 are a pair of sliders 31 and 32. As is best seen in Figures 3 and 4, support 22 is slotted to receive sliders 31 and 32 with each side of the slot being undercut to form a way 33 within which is received a projecting tongue 34 on the side of the slider. The portions of holders 22 below sliders 31 and 32 have openings 35 and 36 therein to permit free movement of the holders mounted on the sliders as hereinafter described. Across one end of sliders 31 and 32 is a connecting cross bar 37 attached to each of the sliders.

Mounted on the supports 22 are five material holders, generally 40, 41, 42, 43, and 44. Except for the place where attached, the holders are all identical and the following description of holder 43 will be equally applicable to all of the holders. As shown in Figure 4 a pair of hemi-cylinders 46 and 47 make up the split, material holding, cup supported on the top of a sleeve 48 by means of a pair of arms 49 and 50 secured to brackets 51 and 52 by means of pins 53 and 54, respectively. Within sleeve 48 is a plunger 56 resiliently urged downwardly by a spring 57. The extent of the downward movement is limited by a pin 58 passing through plunger 56 sufficiently far to contact the upper face of sleeve 48.

At the upper end of plunger 56 are a pair of links 59 and 60 attached to plunger 56 by pin 61. The other ends of links 59 and 60 are secured to a lower extension of arms 49 and 50, respectively, by means of pins 62 and 63, respectively. This linkage between arms 49 and 50 and links 59 and 60 forms an actuating means for the opening and the closing of the cup in response to vertical movements of plunger 56. At its bottom end, sleeve 48 extends outwardly in the form of a circular flange 65. Projecting from flange 65 are two hook-shaped rods 66, spaced 180 degrees apart and aligned 45 degrees from the positon of the cup.

A cylindrical member 67 is attached to, and forms a part of, slider 32. Sleeve 48 is journaled within member 67. In the case of holders 40, 42, and 44, the cylindrical member 67 is attached to the fixed portions 68, 69, and 70, respectively, of support 22. In the case of holders 41 and 43, the cylindrical member 67 is attached to sliders 31 and 32, respectively, and projects through openings 36 and 35, respectively.

Mounted above the conveyor 11 are four knives 71, 72, 73, and 74, secured to a shaft 76. Shaft 76 is mounted in bearings 75 attached to frame 10. At one end of shaft 76 is a sprocket 78 connected by a chain 79 to a sprocket 80 on the shaft of motor 81. Preferably the motor 81 is a slow-speed motor or has a suitable gear reduction so that the rotation of knives 71 through 74 is relatively slow.

A second motor 83 is used to drive the moving parts other than the knives. Motor 83 is connected to a countershaft 84 by means of sprockets 85 and 86 and chain 87.

The power is transmitted to the conveyor drive shaft 20 from shaft 84 by a Geneva drive mechanism and a pair of gears. A stud 89, projecting from wheel 90 secured to shaft 84, engages wheel 91 by sequentially entering one of the four slots, 92, therein. Such an engagement occurs once during each rotation of wheel 90 and results in a 90 degree rotation of wheel 92 before the pin disengages from the slot. Wheel 91 is loosely mounted on shaft 93 and the outer portion thereof is cut with gear teeth 94. Gear teeth 94 mesh with gear 95 secured to shaft 20.

The inner face of wheel 90 forms a box cam 98 within which is received a cam follower 99. Follower 99 is secured to a depending portion of a carriage 100 mounted on a pair of rails 101 and 102 forming a part of frame 10. Thus for each revolution of wheel 90, cam 98 and cam follower 99 move carriage 100 forward and back over a predetermined length of travel.

To the rear of carriage 100 is a shaft 104 journaled in frame 10. Attached to shaft 104 is a latch 105 and a projecting arm 106. Arm 106 is secured to carriage 100 by means of a connecting rod 107.

On the bottom run of the conveyor, carriage 100 and the parts carried thereon are duplicated in a carriage 110 supported on rails 111 and 112. Carriage 110 is driven from carriage 100 by means of a rocker arm 113 secured to carriage 100 by a connecting rod 114 and secured to carriage 110 by connecting rod 115. Rocker arm 113 is loosely mounted on shaft 104.

On top of carriage 100 are a series of blocks, 117, 118, 119, 120, and 121, positioned in the path of the forward of the two lugs 66 of the holders 40 through 44, respectively. The carriage also supports a pair of latches 123 urged upwardly by spring 124.

At the rearward end of the machine are a series of cams 127, 128, 129, 130, and 131 secured to the frame 10. The cams 127 through 131 are in line with the plungers 56 of holders 40 through 44, respectively.

In operation the upper run of the conveyor and the material holders are moved a step at a time in the direction indicated by arrow 135. The first step of the holders when reaching the upper run of the conveyor brings the holders over the cams 127 through 131. These cams push upwardly on the plungers of the holders to pull the toggles 59 and 60 up and pivot arms 51 and 52 so as to open the two halves 46 and 47 of the cup structure. The lengths of sausage are at this time laid in the holders, the sausages having been prepared to be the same length as the total length of the holders used. At the start of the next step of the conveyor the plungers slide off of the cams and springs 57 push the plungers downwardly to close the holders about the sausages placed therein. As this step continues the closed holders with the sausages therein are moved past the knives 71 through 74 severing the sausages between each of the cups.

Figure 2:
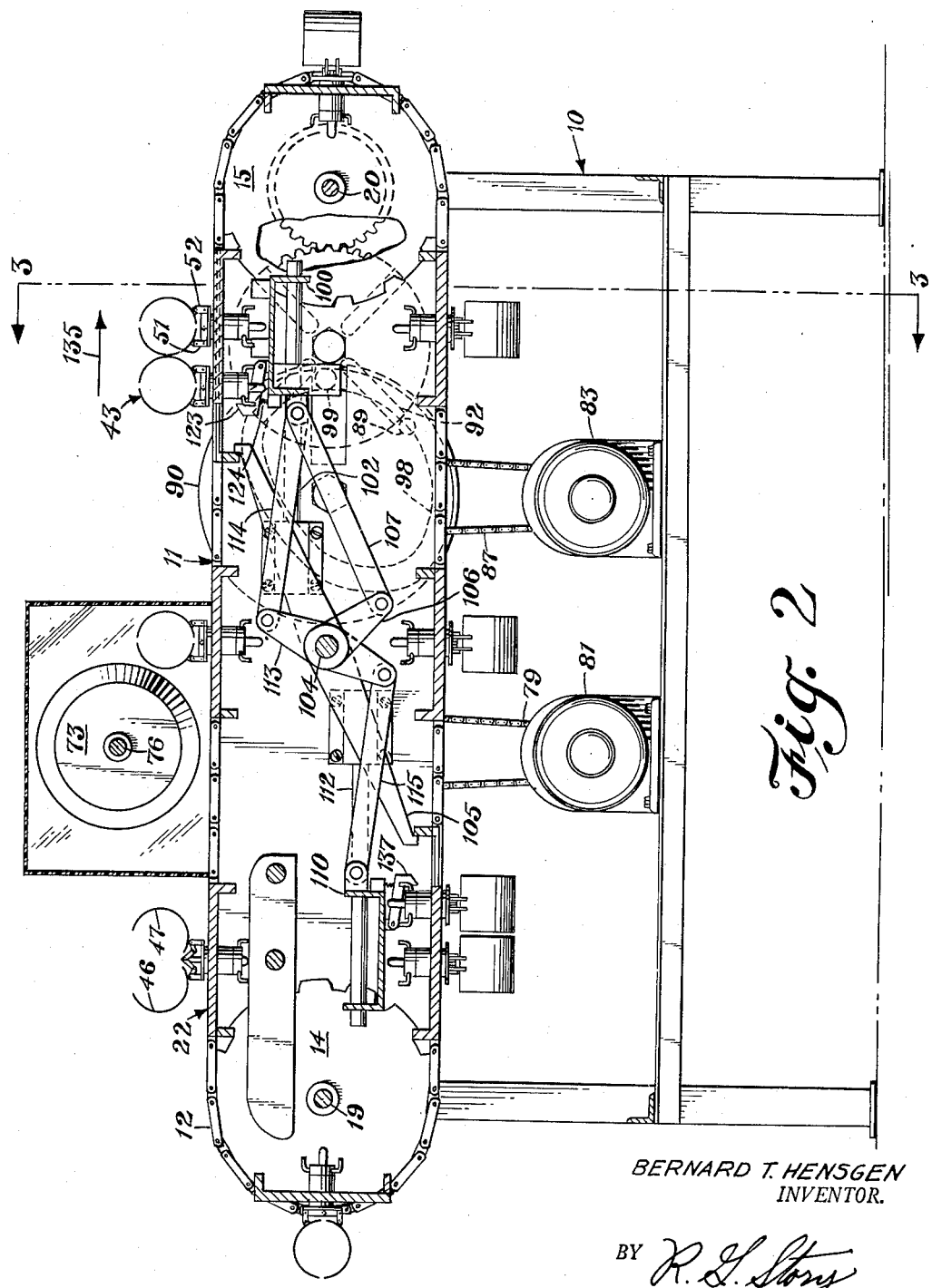
Figure 2 is a partial section taken at line 2—2 of Figure 1.

As the holders with the severed sausages therein move toward the next position during the subsequent step, latch 105 is held upwardly by arm 106 and connecting rod 107. At this time the carriage is relatively stationary because the cam follower 99 is within a dwell portion of cam 98. Latch 105 engages cross bar 37 on sliders 31 and 32 to hold these against movement during the latter portion of the travel of the support 22 to its position of rest during this third step. This moves cups 41 and 43 out of line with cups 40, 42, and 44 into a staggered position as shown at the right of Figures 1 and 2. The continued rotation of wheel 90 moves carriage 100 rearwardly, which movement turns latch 105 to disengage the latch from the cross bar 37. During the rearward movement of the carriage, blocks 117 through 121 contact the forward rods 66 of holders 40 through 44, respectively, and by pushing against the rods rotate the holders 90 degrees. At the end of its rearward stroke, latch 123 slips under cross bar 37 to engage the cross bar. With the forward movement of carriage 100 the latch 123 pulls sliders 31 and 32 forwardly so that holders 41 and 43 return into line with holders 40, 42, and 44.

During the following step the holders are moved to the forward end of the conveyor and are held there in a vertical position at which time the sausage or other material can be pushed from the holders into cans or other desired receptacles.

During the third step following the removal of the material from the holders the cross bar 37 is engaged by the lower end of latch 105. Carriage 110 then moves to the right in Figure 2 to rotate the cups in the reverse direction through 90 degrees and to release latch 105. Upon the return movement of carriage 110, latch 137, corresponding to latch 123, on carriage 110 engages cross bar 37 to realign the cups, at which time they are in proper alignment for loading.

I claim:

1. In a material handling device, a frame, a conveyor mounted on said frame, a holder support attached to said conveyor for movement thereby along a predetermined path, power mechanism connected to said conveyor to move said support, a plurality of material holders rotatably mounted on said holder support and positioned in a row transverse to said path, said holder support including means whereby the alternate cups in said row may be moved from a first position at which all of the cups in the row are in a line to a second position at which the cups in said row are staggered, and means to rotate said holders when said holders are in said second position.

2. In a material handling device, a frame, a conveyor mounted on said frame, a holder support attached to said conveyor for movement thereby along a predetermined path, power mechanism connected to said conveyor to move said support, at least three material holders rotatably mounted on said holder support and positioned in a row transverse to said path, said holder support including at least one slider positioned between two fixed portions thereof and movable along a line, one of said holders being connected to said slider and the other two of said holders being connected to said fixed portions, respectively, means to move said slider from a first position at which said three holders are in a line to a second position at which said holders are staggered, and means to rotate said holders when in said staggered position.

3. In a material handling device, a frame, a conveyor mounted on said frame, a holder support attached to said conveyor for movement thereby along a predetermined path, power mechanism connected to said conveyor to move said support a step at a time, at least three material holders rotatably mounted on said holder support and position in a row transverse to said path, said holder support including at least one slider positioned between two fixed portions thereof and movable along a line parallel to said path, one of said holders being connected to said slider and the other two of said holders being connected to said fixed portions, respectively, means positioned at a point along said path to engage said slider whereby as a holder support moves a step across said point said fixed members will move beyond said slider to position said holders in staggered relationship, means to rotate said staggered holders, and means to disengage said first mentioned means and to move said slider to a position where the holder mounted thereon is aligned with the other two holders.

4. In a material handling device, a frame, a pair of spaced endless conveyors mounted side by side on said frame, power means connected to said conveyors to simultaneously move each a step at a time in a given direction along a predetermined path with a dwell between each step, a holder support positioned between said conveyors with each end of the support attached to the adjacent conveyor, at least one slider positioned between said ends of and attached to said support and movable with respect to said support along a line parallel to said path, a material holder attached to said slider and movable therewith, a pair of holders attached to said support and positioned at opposite sides of said slider, each of said holders being rotatable with respect to said support, a latch positioned at a point along said path to engage said slider whereby as a holder support moves a step across said point the portions of said support to which said pair of holders are attached will move beyond the portion of said slider to which the first mentioned holder is attached, said power mechanism being constructed and arranged to disengage said latch subsequent to said step, and a carriage positioned to one side of said path and movable parallel to said path from a first position to a second position, said carriage having means to engage said slider when in said first position, said carriage being connected to said power means for movement of said carriage from said second to said first position and back to said second position following said step whereby said slider is engaged and moved in said direction with respect to the remainder of said support, said carriage having means to contact said holders during said movement from said second to said first position to rotate said holders with respect to said support.

5. In a material handling device, a frame, a conveyor mounted on said frame, a holder support attached to said conveyor for movement thereby along a predetermined path in a given direction, power mechanism connected to said conveyor to move said support, at least one slider positioned between the ends of said support and movable with respect to said support along a line, at least three material holders including a sleeve, a plunger, actuating means, resilient means, and a split, generally cylindrical, cup, the sleeve of one holder being journaled in said slider, the sleeves of the other two holders being journaled in said support at opposite sides of said slider, the cup of each holder being positioned to one side of said support and being attached to said sleeve for movement from an open to a closed position, the plunger of each cup extending through the sleeve for movement in a direction transverse to the support, the actuating means of each holder connecting the cup and plunger to open and close the cup in response to movement of the plunger from one position to a second position and return, said resilient means urging said plunger into said one position, means adjacent one point on said path to move said slider from a first position at which said holders are in a line to a second position at which said holders are staggered, means adjacent said one point to engage said sleeve and rotate said cup after said slider is moved to said second position, and means at a second point on said path to contact said plunger and move said plunger to said second position.

6. In a material handling device, a frame, a pair of spaced endless conveyors mounted side by side on said frame, power means connected to said conveyors to simultaneously move each a step at a time in a given direction along a predetermined path with a dwell between each step, a holder support positioned between said conveyors with each end of the support attached to the adjacent conveyor, at least one slider positioned between said ends of and attached to said support and movable with respect to said support along a line parallel to said path, at least three material holders including a sleeve, a plunger, actuating means, resilient means, and a split, generally cylindrical, cup, the sleeve of one holder being journalled in said slider, the sleeves of the other two holders being journaled in said support at opposite sides of said slider, the cup of each holder being positioned to one side of said support and being attached to said sleeve for movement from an open to a closed position, the plunger of each cup extending through the sleeve for movement in a direction transverse to the support, the actuating means of each holder connecting the cup and plunger to open and close the cup in response to movement of the plunger from one position to a second position and return, said resilient means urging said plunger into said one position, a latch positioned at a point along said path to engage said slider whereby as a holder support moves a step across said point the portions of said support to which said pair of holders are attached will move beyond the portion of said slider to which the first mentioned holder is attached, said power mechanism being constructed and arranged to disengage said latch during the dwell subsequent to said step, a carriage positioned to one side of said path and movable parallel to said path from a first position to a second position beyond said point, said carriage having means to engage said slider when in said first position, said carriage being connected to said power means for movement of said carriage from said second to said first position and back to said second position following said step whereby said slider is engaged and moved in said direction with respect to the remainder of said support, said carriage having means to engage said holders during said movement from said second to said first position to rotate said holders with respect to said support, and means at a second point on said path to contact said plunger and move said plunger to said second position.

7. In a material handling device, a frame, a conveyor mounted on said frame, a holder support attached to said conveyor for movement thereby along a predetermined path, power mechanism connected to said conveyor to move said support, a plurality of material holders including a sleeve, a plunger, actuating means, resilient means, and a split, generally cylindrical, cup, the sleeves of said holders being journaled in said support and extending through said support, the cup of each holder being positioned to one side of said support and being attached to said sleeve and symmetrically positioned with respect to said sleeve for movement from an open to a closed position, the plunger of each cup extending through the sleeve for movement in a direction transverse to the support, the actuating means of each holder connecting the cup and plunger to open and close the cup in response to movement of the plunger from one position to a second position and return, said resilient means urging said plunger into said one position, means adjacent two points on said path to engage said sleeve and to rotate said cup ninety degrees at each point, and means intermediate said two points to contact said plunger and move said plunger to said second position.

References Cited in the file of this patent

UNITED STATES PATENTS

| | | |
|---|---|---|
| 1,775,918 | Smith | Sept. 16, 1930 |
| 2,048,156 | Gardner et al. | July 21, 1936 |